(12) United States Patent
Cho et al.

(10) Patent No.: US 11,906,443 B2
(45) Date of Patent: Feb. 20, 2024

(54) OPTICAL SYSTEM FOR IMAGING ENABLING HIGH RESOLUTION

(71) Applicant: GREEN OPTICS CO., LTD., Cheongju-si (KR)

(72) Inventors: Hyun Il Cho, Cheongju-si (KR); Dong Geun Kim, Cheongju-si (KR); Kyoung Sang Moon, Cheongju-si (KR); Jin Ho Kim, Cheongju-si (KR); Jae Hee Byun, Cheongju-si (KR)

(73) Assignee: GREEN OPTICS CO., LTD., Cheongju-si (KR)

( * ) Notice: Subject to any disclaimer, the term of this patent is extended or adjusted under 35 U.S.C. 154(b) by 0 days.

(21) Appl. No.: 18/205,108

(22) Filed: Jun. 2, 2023

(65) Prior Publication Data

US 2023/0384238 A1 Nov. 30, 2023

Related U.S. Application Data

(63) Continuation of application No. PCT/KR2023/004373, filed on Mar. 31, 2023.

(30) Foreign Application Priority Data

Apr. 18, 2022 (KR) .................. 10-2022-0047800
Jul. 5, 2022 (KR) .................. 10-2022-0082754

(51) Int. Cl.
*G01N 21/95* (2006.01)

(52) U.S. Cl.
CPC . *G01N 21/9501* (2013.01); *G01N 2201/0636* (2013.01)

(58) Field of Classification Search
None
See application file for complete search history.

(56) References Cited

U.S. PATENT DOCUMENTS 5,031,976 A * 7/1991 Shafer ................ G02B 17/0856
359/732
5,999,310 A * 12/1999 Shafer ................ G02B 17/0808
359/357

(Continued)

FOREIGN PATENT DOCUMENTS

| JP | 2014078032 A | 5/2014 |
| KR | 10-20140065366 A | 5/2014 |
| KR | 10-20160133473 A | 11/2016 |

OTHER PUBLICATIONS

Office Action issued by Korean Intellectual Property Office in priority application KR 10-2022-0082754, dated Sep. 21, 2022, pp. 1-8.

*Primary Examiner* — Marcus H Taningco
(74) *Attorney, Agent, or Firm* — Dinsmore & Shohl LLP; Yongsok Choi, Esq.

(57) ABSTRACT

Disclosed is an optical system for imaging, which enables high resolution. An optical system for imaging, which focuses inspection light and monitoring light on an inspection target, includes a dioptric group configured to receive inspection light and monitoring light and to primarily focus the inspection light and the monitoring light on different locations, and a reflection dioptric group configured to reflect and refract the inspection light and the monitoring light that have passed through the dioptric group and to bring the inspection light and the monitoring light into one focus.

10 Claims, 4 Drawing Sheets

(56) References Cited

U.S. PATENT DOCUMENTS

| | | | |
|---|---|---|---|
| 6,362,923 B1 * | 3/2002 | Lange | G02B 17/0808 359/689 |
| 2003/0002147 A1 | 1/2003 | Chuang et al. | |
| 2005/0259318 A1 | 11/2005 | Armstrong et al. | |
| 2008/0144023 A1 * | 6/2008 | Shibata | G01N 21/4788 356/237.2 |
| 2014/0071520 A1 * | 3/2014 | Armstrong | H01S 3/2316 359/334 |
| 2015/0260659 A1 | 9/2015 | Chuang et al. | |

* cited by examiner

OPTICAL SYSTEM FOR IMAGING ENABLING HIGH RESOLUTION

CROSS-REFERENCE TO RELATED APPLICATIONS

The present application is a continuation of International Application No. PCT/KR2023/004373 filed on Mar. 31, 2023, which claims priority under 35 U.S.C. § 119(a) to Korean Patent Application Nos. 10-2022-0047800 and 10-2022-0082754 filed in the Korean Intellectual Property Office on Apr. 18, 2022 and Jul. 5, 2022, respectively, the entire disclosures of which are incorporated herein by reference.

BACKGROUND

1. Technical Field

The present disclosure relates to an optical system for imaging, which enables an image for inspections to have high resolution.

2. Related Art

Contents described in this part merely provide background information of the present embodiment, and do not constitute a conventional technology.

In manufacturing a semiconductor circuit, various defects may occur unintentionally. In a process of manufacturing various electronic parts as described above, defect inspections for checking whether the electronic part has been wholly manufacture without a defect need to be performed.

Defect inspections for the electronic part are performed by a device for inspecting a defect by using an electron beam (E-beam) and a device for optically inspecting a defect.

The device for inspecting a defect using an electron beam has an advantage in that a defect can be precisely inspected because resolution is excellent, but has a disadvantage in that the inspection speed of the device is slow. In particular, if a production speed for an electronic part is very fast, such as a case in which the electronic part is a semiconductor, a problem in that the inspection speed of the device for inspecting a defect does not keep up with the production speed may be caused.

Due to such a problem, defect inspections for an electronic part are chiefly performed by an optical inspection device. The optical inspection device inspects whether a defect has occurred in an inspection target by radiating light to the inspection target and sensing reflected light that is reflected by the inspection target.

In general, in order to inspect a defect in an electronic part, in particular, a semiconductor, the optical inspection device uses light having an ultraviolet wavelength band, in particular, a UV-C wavelength band. However, the light having the UV-C wavelength band has a property that the light is well absorbed by most of optical elements which are used in an optical construction, such as a lens. For this reason, the number of optical elements which may be inspected by the UV-C wavelength band is limited. Accordingly, if a wide band object lens is constructed by using a dioptric system, aberration occurs because it is difficult to correct chromatic aberration, and thus many lenses are required in order to compensate for the aberration.

However, if the number of lenses is increased, there are problems in that the assembly and arrangement of the lenses become difficult, efficiency is low because the transmissivity of the entire optical system is reduced, and manufacturing costs for the optical system are increased. In particular, a degree of difficulty in the assembly and arrangement of lenses according to an increase in the number of lenses is not arithmetically proportional, but exponentially proportional. Accordingly, as the number of lenses is increased, there is a problem in that a degree of difficulty in the assembly and arrangement of the lenses becomes significant.

Furthermore, in order to inspect an electronic part, the optical inspection device needs to wholly focus inspection light on the electronic part. To this end, the optical inspection device uses autofocus, that is, a function for automatically focusing the inspection light on a subject. In particular, in order to keep up with the production speed of the electronic part, the optical inspection device uses autofocus using an active method. The optical inspection device checks whether inspection light is wholly focused on a subject by using monitoring light, by additionally radiating the monitoring light that is emitted from a light source different from a light source for the inspection light in order to check whether the inspection light is wholly focused on the subject.

However, in most cases, monitoring light and inspection light have different wavelength bands. If the monitoring light is autofocused as in a ray folding method and has the same light path as the inspection light, locations on which the inspection light and the monitoring light are focused are different from each other due to chromatic aberration. Accordingly, the optical inspection device uses a method of focusing monitoring light on a subject and then focusing inspection light on the subject by moving the entire optical system by a distance between the focus of the monitoring light and the focus of the inspection light.

Accordingly, there is a need for an optical inspection device capable of inspecting whether a defect has occurred in an electronic part by focusing inspection light on the electronic part while not disrupting the production speed of the electronic part.

SUMMARY

An embodiment of the present disclosure is directed to an optical system for imaging, which enables whether a defect occurs in an electronic part to be inspected rapidly and accurately while having high resolution.

According to an aspect of the present embodiment, an optical system for imaging, which focuses inspection light and monitoring light on an inspection target, includes a dioptric group configured to receive inspection light and monitoring light and to primarily focus the inspection light and the monitoring light on different locations, and a reflection dioptric group configured to reflect and refract the inspection light and the monitoring light that have passed through the dioptric group and to bring the inspection light and the monitoring light into one focus.

According to an aspect of the present embodiment, the inspection light includes light having a wavelength band within a preset error range based on 193 nm.

According to an aspect of the present embodiment, the monitoring light includes light having a wavelength band within a preset error range based on 266 nm.

According to an aspect of the present embodiment, the dioptric group includes an iris, a plurality of lenses, and a field lens.

According to an aspect of the present embodiment, the plurality of lenses primarily focuses the inspection light and the monitoring light on a location farther than a location of the field lens in a direction in which the light is incident on the dioptric group.

According to an aspect of the present embodiment, the plurality of lenses primarily focuses the monitoring light on a location farther than a location of the inspection light.

According to an aspect of the present embodiment, the reflection dioptric group includes a plurality of lenses.

According to an aspect of the present embodiment, a first lens that is initially disposed in a direction in which the light is incident from the dioptric group to the reflection dioptric group, among the plurality of lenses, includes a mirror surface on an outer surface of the first lens.

According to an aspect of the present embodiment, the first lens further includes a hollow within the first lens.

According to an aspect of the present embodiment, the hollow is disposed in an optical axis on which the light is incident from the dioptric group to the reflection dioptric group.

As described above, an aspect of the present embodiment has an advantage in that whether a defect occurs in an electronic part can be inspected rapidly and accurately with high resolution.

DETAILED DESCRIPTION

Figure 1:
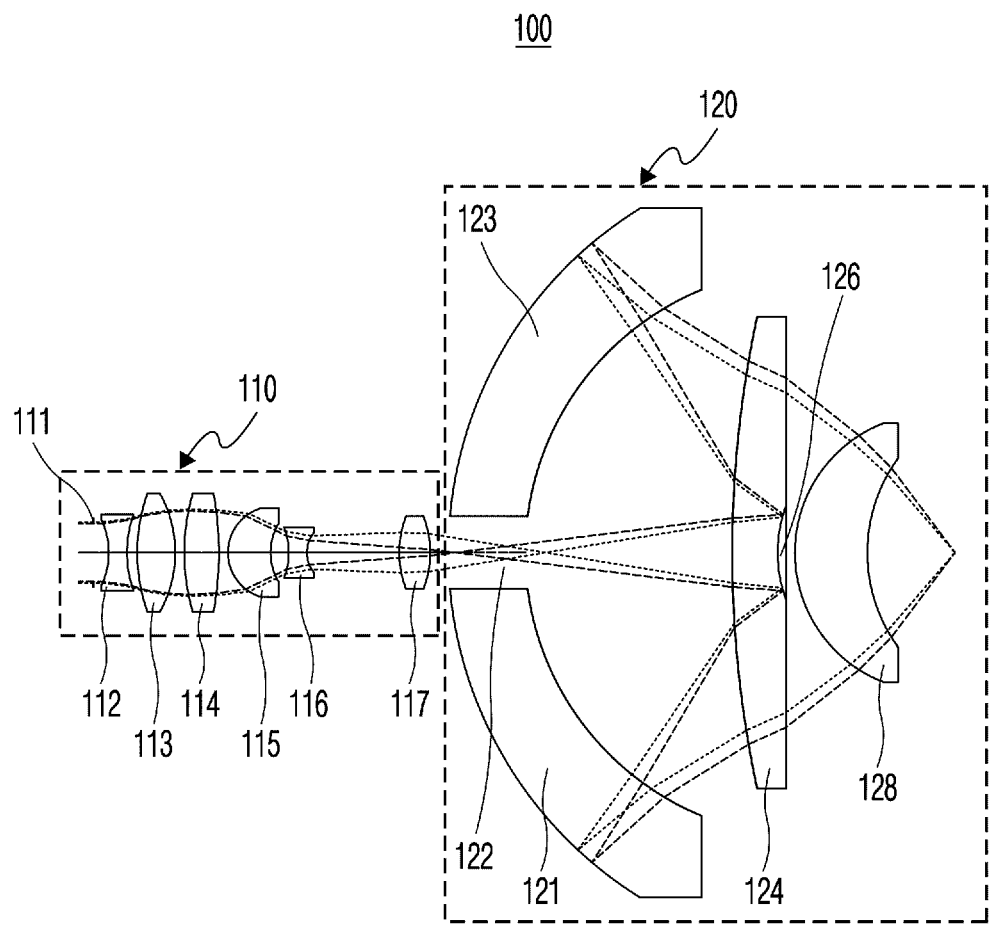
FIG. 1 is a plan view illustrating a construction of an optical system for imaging according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected to" or "coupled to" the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the possible existence or addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

FIG. 1 is a plan view illustrating a construction of an optical system for imaging according to an embodiment of the present disclosure.

Referring to FIG. 1, an optical system 100 for imaging according to an embodiment of the present disclosure includes a dioptric group 110 and a reflection dioptric group 120.

The optical system 100 for imaging brings inspection light and monitoring light, which are incident from the outside, into one focus. The inspection light is light that is focused on an inspection target in the form of one focus in order to inspect whether a defect has occurred in an electronic part, that is, the inspection target, and has a UV-C wavelength band as described in "Related Art". In particular, the inspection light may have a wavelength band that belongs to the UV-C wavelength band and that has a preset error range (e.g., within several nm) based on 193 nm. The monitoring light is light that is radiated in order to monitor whether the inspection light has been wholly focused on the inspection target through the optical system 100, and may have a wavelength band within a preset error range (e.g., within several nm) based on 266 nm.

After the inspection light is radiated to the inspection target, an optical inspection device receives and images reflected light that is reflected by the inspection target. The optical inspection device may determine whether the inspection light has been wholly focused based on the results of the imaging. However, if the optical inspection device determines whether the inspection light has been focused based on the results of the imaging as described above, the production speed of the inspection target becomes slow because the time taken to determine whether the inspection light has been focused is increased.

In order to prevent such a problem, not only inspection light, but monitoring light is incident on the optical system 100 for imaging. The inspection light is focused on an inspection target and performs inspections. At the same time, the monitoring light is radiated to the inspection target and monitors whether the inspection light has been wholly focused. The monitoring light may be monitored, as the monitoring light is reflected again or branched to a separate path and sensed.

As described above, the inspection light and the monitoring light have different wavelength bands. The inspection light and the monitoring light have different wavelength bands, and the wavelength band of the inspection light is the UV-C wavelength band. Accordingly, the type of optical part available for the inspection light is limited due to the absorption of light. If the inspection light and the monitoring light are focused with the same numerical aperture (NA) in a situation in which inspection light and the monitoring light pass through an optical part, a lot of optical parts need to be disposed in order to reduce chromatic aberration. The optical system 100 for imaging makes different effective focal lengths (EFLs) of the inspection light and the monitoring light by differently adjusting locations on which the inspection light and the monitoring light are focused on their light paths by using the dioptric group 110. Accordingly, although the inspection light and the monitoring light that are focused have different numerical apertures (NA), the optical system 100 adjusts the inspection light and the monitoring light so that the inspection light and the monitoring light are finally focused on the same point.

The dioptric group 110 brings incident light into the reflection dioptric group 120 by refracting the incident light, and primarily focuses the incident light between the dioptric group 110 and the reflection dioptric group 120 or into the reflection dioptric group 120 depending on the wavelength of the incident light. This is for correcting chromatic aberration of the entire optical system by coupling the dioptric group 110 to the reflection dioptric group 120 in the latter part of the optical system.

The dioptric group 110 includes an iris 111, first to fifth lenses 112 to 116, and a field lens 117.

The iris 111 is disposed for the first time in a direction in which light is incident on the dioptric group 110, and adjusts the area or a form of the light incident on the dioptric group 110. The iris 111 may be replaced with an iris having a proper form or size, if necessary.

The first to fifth lenses 112 to 116 receive the light passing through the iris 111, and primarily focus the light beyond the field lens 117 (i.e., in the direction in which the light is incident on the dioptric group). The first to fifth lenses 112 to 116 primarily focus inspection light that has passed through the first to fifth lenses 112 to 116, between the dioptric group 110 and the reflection dioptric group 120, and primarily focus monitoring light into the reflection dioptric group 120.

The first lens 112 is disposed in the rear of the iris 111 in the direction in which the light is incident on the dioptric group 110. The first lens 112 has the radii of curvature of −8.3800 mm and 12.6100 mm on both sides thereof, respectively, and a thickness of 2.0000 mm in the direction in which the inspection light is incident.

The first lens 112 may be implemented as a vitreous fluoride material. In particular, the first lens 112 may be implemented by using calcium fluoride ($CaF_2$). Vitreous fluoride has a characteristic in which the absorption rate of vitreous fluoride for light having a UV-C region is relatively smaller than the absorption rate of another component. However, since vitreous fluoride has inherent birefringence, vitreous fluoride may cause a problem in that the quality of an image that is finally formed deteriorates. Accordingly, one lens (i.e., the first lens 112) is disposed within the dioptric group 110, and one lens is also disposed within the reflection dioptric group 120, thus compensating for birefringence. Furthermore, the first lens 112 needs to be rotated in the state in which the optical axis of the dioptric group 110 has been matched with the optical axis of the reflection dioptric group 120 in order to compensate for birefringence. Accordingly, the first lens 112 is disposed within the dioptric group 110 for the first time so that the first lens 112 can be easily rotated.

The second to fifth lenses 113 to 116 are sequentially disposed in the rear of the first lens 112 in the direction in which the light is incident on the dioptric group 110. Each of the lenses 113 to 116 is implemented by using fused silica having a characteristic in which the absorption rate of fused silica for light having a UV-C region is relatively small differently from the vitreous fluoride material.

The second lens 113 has the radii of curvature of 19.6400 mm and −13.2700 mm on both sides thereof, respectively, and a thickness of 4.2000 mm in the direction in which the inspection light is incident.

The third lens 114 has the radii of curvature of 23.3500 mm and −37.2920 mm on both sides thereof, respectively, and a thickness of 3.8000 mm in the direction in which the inspection light is incident.

The fourth lens 115 has the radii of curvature of 5.1000 mm and −6.3100 mm on both sides thereof, respectively, and a thickness of 4.7000 mm in the direction in which the inspection light is incident.

The fifth lens 116 has the radii of curvature of −7.8400 mm and 3.5000 mm on both sides thereof, respectively, and a thickness of 2.0000 mm in the direction in which the inspection light is incident.

Each of the lenses 112 to 116 has the aforementioned characteristic and primarily focuses inspection light or monitoring light that is incident on the dioptric group 110 on the aforementioned location. As the inspection light or the monitoring light is primarily focused in the rear of the field lens 117, the light that enters or has already entered the reflection dioptric group 120 may have a small divergence angle. Accordingly, although a total size (i.e., the diameter) of the reflection dioptric group 120 is not increased, the numerical aperture (NA) of light that will be finally focused may be increased.

The field lens 117 is disposed at a location before light that has passed through each of the lenses 112 to 116 is primarily focused. Light that is incident on the field lens 117 is incident on the field lens 117 while forming an angle to an optical axis that is formed by each of the lenses 112 to 116 and the field lens 117. The field lens 117 changes the direction of the light that is incident thereon and adjusts a degree of the light being focused. The light that is incident on the field lens 117 while forming the angle to the optical axis may cause a Vignetting effect. In order to prevent such a problem and adjust the degree of the light being focused which passes through the field lens 117, the field lens 117 is disposed at the aforementioned location.

The field lens 117 has the radii of curvature of 11.1800 mm and −11.1800 mm on both sides thereof, respectively, and a thickness of 3.4000 mm in the direction in which the inspection light is incident.

The reflection dioptric group 120 reflects and refracts lights that is incident thereon through the dioptric group 110, and brings inspection light and monitoring light into one focus. The reflection dioptric group 120 includes a sixth lens 121, a seventh lens 124, and an eighth lens 128.

The sixth lens 121 has a form in which both ends of the sixth lens are bent toward the eighth lens 128 (i.e., a form in which the sixth lens is convex in the direction in which light that has passed through the dioptric group 110 enters the reflection dioptric group 120). The sixth lens 121 includes a mirror surface 123 on the outer surface (i.e., the outer surface of the sixth lens 121 in the direction in which the light that has passed through the dioptric group 110 is incident) of the sixth lens 121 in order to reflect reflected light that is reflected by a convex mirror 126 within the seventh lens 124 again. As the outer surface of the sixth lens 121 is formed of the mirror surface 123, the light that is reflected by the convex mirror 126 can be focused in the form of one focus via the seventh lens 124 and the eighth lens 128.

The sixth lens 121 includes the mirror surface 123 on the outer surface thereof in the direction in which the light that has passed through the dioptric group 110 is incident. As the mirror surface 123 is included in the outer surface of the sixth lens 121, light that is reflected by the convex mirror 126 can be reflected by the mirror surface 123 through more paths. Accordingly, the numerical aperture of light that will be finally focused can be increased. An increase in the numerical aperture corresponds to a factor that improves resolution of inspection light. Accordingly, the optical system 100 for imaging can improve resolution of inspection light through only a simple construction.

The sixth lens 121 includes the mirror surface 123 on the outer surface thereof as described above. In this case, a problem in that the light that has passed through the dioptric group 110 is reflected by the outer surface of the sixth lens 121 may occur. The sixth lens 121 includes a hollow 122 within, more specifically, in the optical axis on which the light is incident through the field lens 117, so that the light that has passed through the dioptric group 110 can be incident into the sixth lens 121. A divergence angle of the inspection light or the monitoring light that passes through the sixth lens 121 is not great because the inspection light or the monitoring light passes through the first to fifth lenses 112 to 116 within the dioptric group 110 and is primarily focused in the rear end of the field lens 117 as described above. Accordingly, the size of the hollow 122 within the sixth lens 121 may be small.

The sixth lens 121 has the radii of curvature of 44.7040 mm and 31.3600 mm on both sides thereof, respectively, and a thickness of 8.5000 mm in the direction in which the inspection light is incident.

The seventh lens 124 is disposed in the rear of the sixth lens 121 in the direction in which the light is incident. The seventh lens 124 reflects the light that has passed through the dioptric group 110 and transmits light that is incident thereon after being reflected by the mirror surface 123 of the sixth lens 121.

Like the first lens 112, the seventh lens 124 is implemented by using the vitreous fluoride material. As the seventh lens 124 is implemented by using the vitreous fluoride material, such as calcium fluoride ($CaF_2$), like the first lens 112 and is disposed in the reflection dioptric group 120, a problem such as birefringence is compensated for, a chromatic aberration balance between the dioptric group 110 and the reflection dioptric group 120 is reduced, and a problem such as chromatic aberration is solved.

The convex mirror 126 is disposed in the optical axis within the seventh lens 124. The convex mirror 126 is disposed in the optical axis within the seventh lens 124, and reflects light that has passed through the hollow 122 of the sixth lens 121 toward the sixth lens 121. Since the convex mirror 126 reflects the light that is incident thereon, the light that has been reflected by the convex mirror 126 travels while being radiated toward the sixth lens 121.

The light that has been reflected by the mirror surface 123 of the sixth lens 121 is incident on the seventh lens 124 again. The light that is incident on the seventh lens 124 travels while being radiated again through the seventh lens 124.

The seventh lens 124 has the radius of curvature of 124.9700 mm and a plane on both sides thereof, respectively, in the direction in which the inspection light is incident. A distance between the centers of the two faces of the seventh lens in the optical axis is 5.9000 mm. Furthermore, the radius of curvature of the convex mirror 126 disposed in the seventh lens 124 is 14.8000 mm. A distance between the first face of the seventh lens 124, which has the radius of curvature of 124.9700 mm, and the optical axis is 5.0000 mm.

The eighth lens 128 has a form in which both ends of the eighth lens is bent toward a point on which light will be focused (i.e., a convex form in the direction in which light that has passed through the seventh lens 124 enters the eighth lens 128). The eighth lens 128 increases the numerical aperture of light to be focused thereon by radiating the light that is incident thereon.

The eighth lens 128 has the radii of curvature of 15.3200 mm and 17.7100 mm on both sides thereof, respectively, and a thickness of 8.0000 mm in the direction in which the inspection light is incident.

The optical system 100 for imaging includes the dioptric group 110 and the reflection dioptric group 120 including the aforementioned optical components. Accordingly, the optical system 100 for imaging and light that passes through the optical system 100 for imaging may have the following characteristics.

TABLE 1

| | Inspection light | Monitoring light |
|---|---|---|
| Field of view (FoV) | 0.16 mm | |
| Effective focal length (EFL) | 4 mm | 4.81 mm |
| Magnification (Mag.) | Approximately 50× | |
| Numerical aperture (Na) | 0.8 | 0.7 |
| Total top length (TTL) | 95 mm | |
| Working distance (WD) | 6.5 mm | |
| Distortion | −0.002% | |
| Bore/size | a maximum of 50 mm | |

The inspection light and the monitoring light have different EFLs. For this reason, although inspection light and monitoring light having different wavelength bands are incident on the optical system, the inspection light and the monitoring light can be focused on the same point without chromatic aberration. The inspection light may be focused with a numerical aperture equal to or greater than a preset reference value (i.e., with resolution equal to or greater than a preset reference value). Furthermore, it may be seen that although the optical system 100 for imaging enables the inspection light and the monitoring light to have the aforementioned characteristics, the optical system 100 for imaging has characteristics that are substantially identical with the TTL, WD, and bore of a common lens or optical system. A process of focusing inspection light and monitoring light on the same point without chromatic aberration although the inspection light and the monitoring light are incident on the optical system is illustrated in FIG. 2.

Figure 2A:
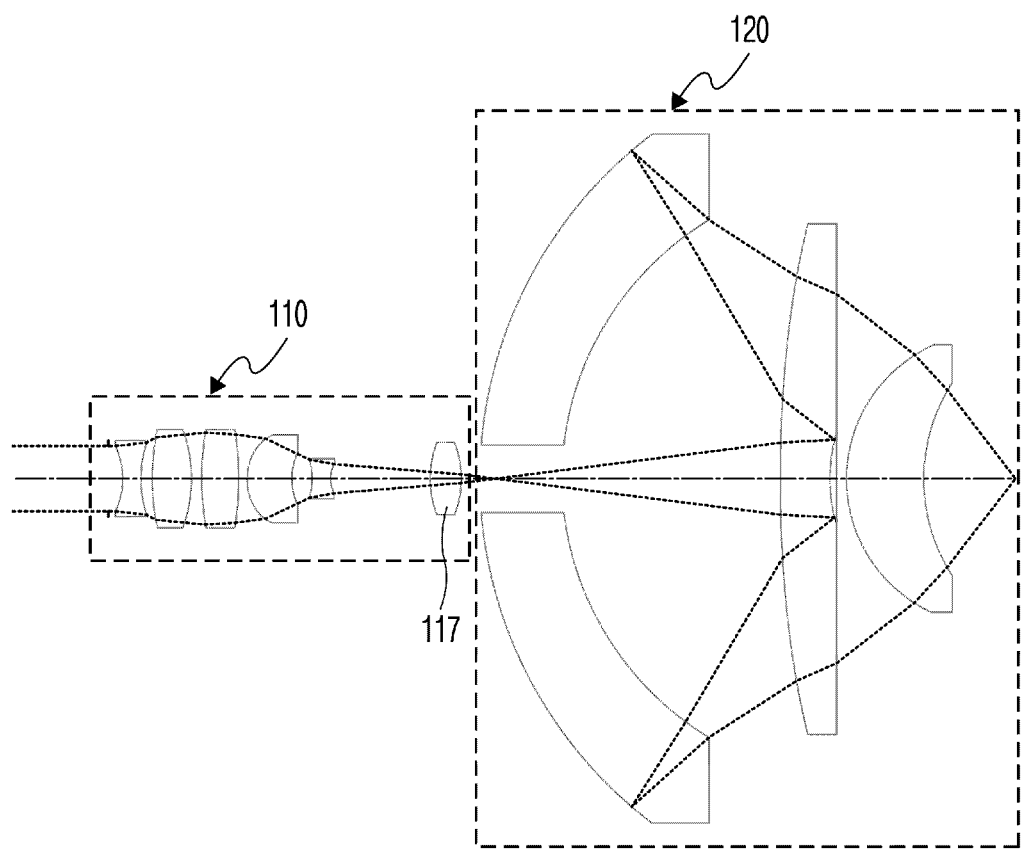
FIG. 2A is a diagram illustrating a path along which inspection light travels through the optical system for imaging according to an embodiment of the present disclosure.
Figure 2B:
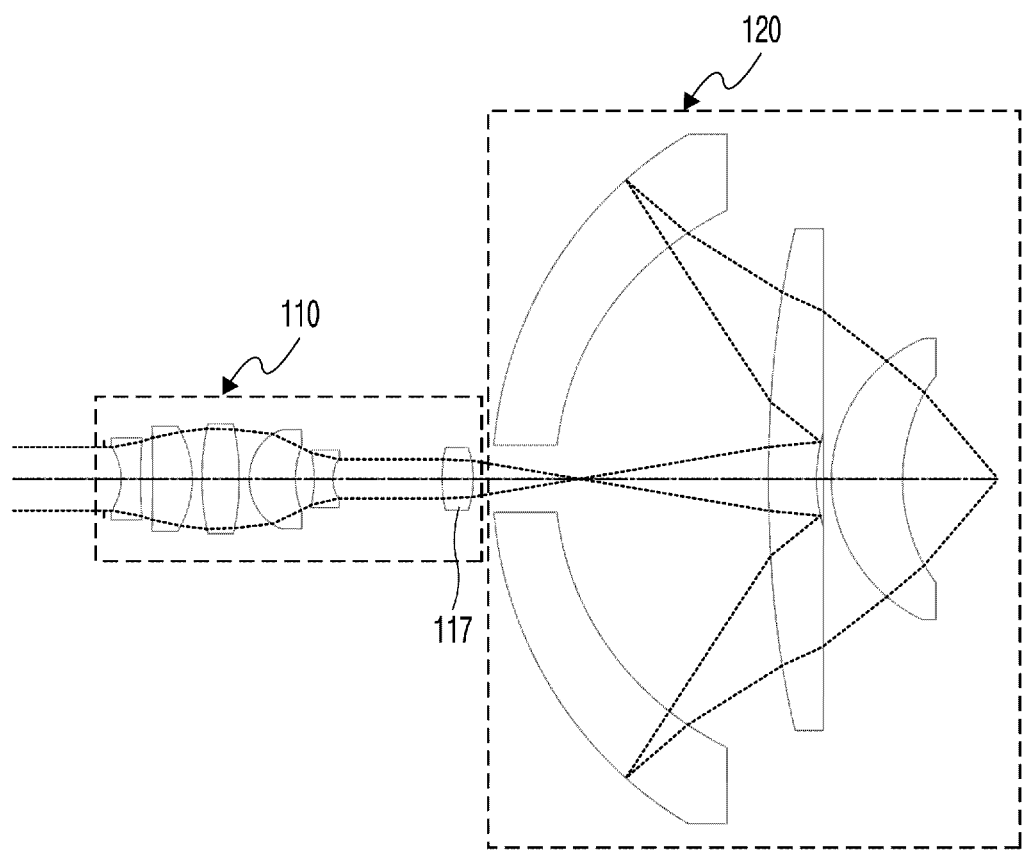
FIG. 2B is a diagram illustrating a path along which monitoring light travels through the optical system for imaging according to an embodiment of the present disclosure.

FIG. 2A is a diagram illustrating a path along which inspection light travels through the optical system for imaging according to an embodiment of the present disclosure. FIG. 2B is a diagram illustrating a path along which monitoring light travels through the optical system for imaging according to an embodiment of the present disclosure.

Referring to FIG. 2A, the inspection light passes through the dioptric group 110, and is primarily focused via the field lens 117. In this case, the inspection light is primarily focused into the hollow 122 of the sixth lens 121 via the field lens 117. Thereafter, the inspection light travels to the seventh lens 124 while being radiated again, and travels to the sixth lens 121 after being reflected by the convex mirror 126 within the seventh lens 124. The inspection light is reflected by the mirror surface 123 of the sixth lens 121, and is focused via the sixth lens 121, the seventh lens 124, and the eighth lens 128. The inspection light can be focused with a very great numerical aperture, because the inspection light is reflected by the convex mirror 126 and the inspection light is reflected by the mirror surface 123 and radiated while passing through all of the sixth lens 121, the seventh lens 124, and the eighth lens 128 as described above.

Referring to FIG. 2B, the monitoring light is also focused along the same path as the inspection light. However, the monitoring light is primarily focused between the sixth lens 121 and the seventh lens 124 beyond the hollow 122 of the sixth lens 121. The monitoring light and the inspection light are primarily focused on different points and have different EFLs. Although chromatic aberration inevitably occurs due to the optical components of the monitoring light and the inspection light, the monitoring light and the inspection light can be focused on the same point. Accordingly, the optical system 100 for imaging can perform inspections more rapidly because the optical system 100 for imaging does not require a procedure of focusing inspection light on a subject by moving the entire optical system by a distance between the focus of monitoring light and the focus of the inspection light.

Figure 3:
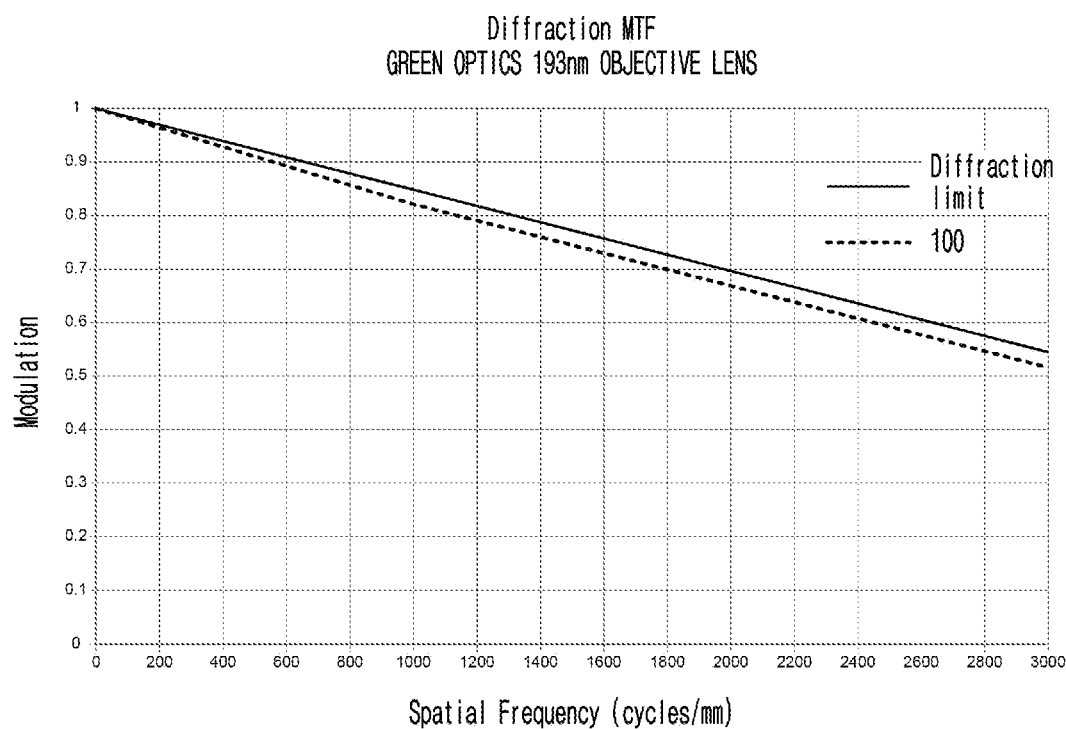
FIG. 3 is a graph illustrating an MTF curve of the optical system for imaging according to an embodiment of the present disclosure.

FIG. 3 is a graph illustrating a modulation transfer function (MTF) curve of the optical system for imaging according to an embodiment of the present disclosure.

The MTF is one of indices that quantitatively indicate resolution of an optical lens or an optical system. It may be seen that when a value of the MTF is closer to 1, a corresponding optical lens or optical system has excellent characteristics.

However, the value of the MTF cannot become 1 theoretically due to the theoretical limit of diffraction of the optical components, and has diffraction thresholds as illustrated in FIG. 3.

From FIG. 3, it may be seen that the optical system 100 for imaging has MTF values quite close to MTF values corresponding to the diffraction thresholds. That is, the optical system 100 for imaging can implement high resolution because the optical system 100 for imaging includes the aforementioned components.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. An optical system for imaging, which focuses inspection light and monitoring light on an inspection target, the optical system comprising:
   a dioptric group configured to receive inspection light and monitoring light and to primarily focus the inspection light and the monitoring light on different locations; and
   a reflection dioptric group configured to reflect and refract the inspection light and the monitoring light that have passed through the dioptric group and to bring the inspection light and the monitoring light into one focus,
   wherein the inspection light and the monitoring light have different wavelength bands within a UV-C wavelength band,
   a lens that is first disposed within the dioptric group is implemented as a vitreous fluoride material, and
   a lens configured to reflect light passing through the dioptric group within the reflection dioptric group and to transmit light that is incident thereon after being reflected by a mirror surface of a lens within the reflection dioptric group is implemented as a vitreous fluoride material.

2. The optical system of claim 1, wherein the inspection light comprises light having a wavelength band within a preset error range based on 193 nm.

3. The optical system of claim 1, wherein the monitoring light comprises light having a wavelength band within a preset error range based on 266 nm.

4. The optical system of claim 1, wherein the dioptric group comprises an iris, a plurality of lenses, and a field lens.

5. The optical system of claim 4, wherein the plurality of lenses primarily focuses the inspection light and the monitoring light on a location farther than a location of the field lens in a direction in which the light is incident on the dioptric group.

6. The optical system of claim 5, wherein the plurality of lenses primarily focuses the monitoring light on a location farther than a location of the inspection light.

7. The optical system of claim 1, wherein the reflection dioptric group comprises a plurality of lenses.

8. The optical system of claim 7, wherein a first lens that is initially disposed in a direction in which the light is incident from the dioptric group to the reflection dioptric group, among the plurality of lenses, comprises a mirror surface on an outer surface of the first lens.

9. The optical system of claim 8, wherein the first lens further comprises a hollow within the first lens.

10. An optical system for imaging, which focuses inspection light and monitoring light on an inspection target, the optical system comprising:
    a dioptric group configured to receive inspection light and monitoring light and to primarily focus the inspection light and the monitoring light on different locations; and
    a reflection dioptric group configured to reflect and refract the inspection light and the monitoring light that have passed through the dioptric group and to bring the inspection light and the monitoring light into one focus,
    wherein the inspection light and the monitoring light have different wavelength bands within a UV-C wavelength band, each of one lens within the dioptric group and one lens within the reflection dioptric group is implemented as a vitreous fluoride material, the dioptric group comprises some or all of first to fifth lenses, and the reflection dioptric group comprises:

an eighth lens has a form in which both ends of the eighth lens are bent toward a point on which light is to be focused;

a sixth lens has a form in which both ends of the sixth lens are bent toward the eighth lens, comprises a hollow, and has a mirror surface on one surface thereof; and a seventh lens is disposed in a rear of the sixth lens in a direction in which light is incident, reflects the light that has passed through the dioptric group, and transmits light that is incident thereon after being reflected by the mirror surface of the sixth lens.

* * * * *